US008518286B2

(12) United States Patent
Basaly

(10) Patent No.: US 8,518,286 B2
(45) **Date of Patent: *Aug. 27, 2013**

(54) METHODS AND COMPOSITONS FOR ACID TREATMENT OF A METAL SURFACE

(75) Inventor: Mores Basaly, Roswell, GA (US)

(73) Assignee: Houghton Technical Corp., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/564,889

(22) Filed: Aug. 2, 2012

(65) Prior Publication Data

US 2012/0298626 A1 Nov. 29, 2012

Related U.S. Application Data

(60) Continuation of application No. 12/336,582, filed on Dec. 17, 2008, now Pat. No. 8,252,195, which is a division of application No. 11/504,014, filed on Aug. 15, 2006.

(60) Provisional application No. 60/709,452, filed on Aug. 19, 2005.

(51) Int. Cl.

| | |
|---|---|
| ***C03C 15/00*** | (2006.01) |
| ***C03C 25/68*** | (2006.01) |
| ***C25F 3/00*** | (2006.01) |
| ***C23F 1/20*** | (2006.01) |

(52) U.S. Cl.
USPC .......... 216/104

(58) Field of Classification Search
USPC .......... 216/104
See application file for complete search history.

(56) References Cited

U.S. PATENT DOCUMENTS

| | | | | |
|---|---|---|---|---|
| 2,316,220 A | | 4/1943 | Brown | |
| 2,593,449 A | | 4/1952 | Hesch | |
| 2,687,346 A | | 8/1954 | McDonald | |
| 2,762,694 A | * | 9/1956 | Newman | 216/102 |
| 2,942,956 A | | 6/1960 | Kelly | |
| 3,106,499 A | | 10/1963 | Kendall | |
| 3,326,803 A | | 6/1967 | Kelly | |
| 3,331,710 A | | 7/1967 | Lodeesen | |
| 3,448,055 A | | 6/1969 | Mickelson | |
| 3,616,098 A | | 10/1971 | Falls | |
| 3,852,232 A | | 12/1974 | Bowman | |
| 3,879,216 A | | 4/1975 | Austin | |
| 3,915,811 A | | 10/1975 | Tremmel | |
| 4,016,255 A | | 4/1977 | Forward | |
| 4,396,599 A | | 8/1983 | Sipos | |
| 4,451,329 A | | 5/1984 | Batchelor | |
| 4,469,544 A | | 9/1984 | Goodman | |
| 4,505,223 A | | 3/1985 | Goodman | |
| 4,515,771 A | | 5/1985 | Fine | |
| 4,541,945 A | | 9/1985 | Anderson | |
| 4,566,889 A | | 1/1986 | Schmadel | |
| 4,725,137 A | | 2/1988 | Schmadel | |
| 4,765,822 A | | 8/1988 | Barber | |
| 4,804,241 A | | 2/1989 | Goodman | |
| 4,851,148 A | | 7/1989 | Yamasoe | |
| 4,919,906 A | | 4/1990 | Barber | |
| 4,938,938 A | | 7/1990 | Ewers | |
| 4,956,015 A | | 9/1990 | Okajima | |
| 5,165,907 A | | 11/1992 | Chieng | |
| 5,417,819 A | | 5/1995 | Askin | |
| 5,421,906 A | | 6/1995 | Borah | |
| 5,538,600 A | * | 7/1996 | Schultz et al. | 428/31 |
| 5,669,980 A | | 9/1997 | McNeil | |
| 5,705,089 A | | 1/1998 | Sugihara | |
| 5,755,989 A | | 5/1998 | Ishii | |
| 5,972,862 A | | 10/1999 | Torii | |
| 5,976,988 A | | 11/1999 | Konuma | |
| 6,083,289 A | | 7/2000 | Ono | |
| 6,162,301 A | | 12/2000 | Zhang | |
| 6,396,148 B1 | | 5/2002 | Eichelberger | |
| 6,419,784 B1 | | 7/2002 | Ferrier | |
| 6,656,021 B2 | | 12/2003 | Ota | |
| 6,656,022 B2 | | 12/2003 | Ota | |
| 6,726,856 B2 | | 4/2004 | Glausch | |
| 6,758,872 B2 | | 7/2004 | Ota | |
| 6,824,754 B2 | | 11/2004 | Subramaniam | |
| 7,029,597 B2 | | 4/2006 | Marczak | |
| 8,252,195 B2 | * | 8/2012 | Basaly | 216/85 |
| 2001/0048161 A1 | | 12/2001 | Chopra | |
| 2002/0043026 A1 | | 4/2002 | Luo | |

(Continued)

FOREIGN PATENT DOCUMENTS

| | | |
|---|---|---|
| FR | 1409489 | 8/1965 |
| FR | 2208994 | 6/1974 |

(Continued)

OTHER PUBLICATIONS

Itou, Abstract of JP 59229498 A (Dec. 22, 1984).

English abstract of Japanese Patent Application No. 2001-244299.

Office Action dated Jul. 9, 2010 issued in Australian Patent Application No. 2006283664.

Response filed by Applicant to the Office Action dated Jul. 9, 2010 issued in related Australian Patent Application No. 2006283664.

Office Action dated May 13, 2011 issued in Australian Patent Application No. 2006283664.

(Continued)

*Primary Examiner* — Binh X Tran
*Assistant Examiner* — Thomas Pham
(74) *Attorney, Agent, or Firm* — Howson & Howson LLP

(57) ABSTRACT

The invention relates to compositions and methods that are useful in etching a metal surface. In particular, the invention relates to novel acid compositions and methods of using such compositions in etching a metal surface, preferably an aluminum surface prior to anodizing to dissolve impurities, imperfections, scale, and oxide. The compositions are effective in maintaining their etching capacity and in removing smut produced by the etching of a surface as well as in general cleaning.

19 Claims, No Drawings

(56) References Cited

U.S. PATENT DOCUMENTS

| | | | |
|---|---|---|---|
| 2003/0144163 | A1 | 7/2003 | Morinaga |
| 2003/0172959 | A1 | 9/2003 | Martin |
| 2005/0214191 | A1 | 9/2005 | Mueller |
| 2007/0066503 | A1 | 3/2007 | Basaly |
| 2009/0090635 | A1 | 4/2009 | Basaly |

FOREIGN PATENT DOCUMENTS

| | | |
|---|---|---|
| GB | 945024 | 12/1996 |
| JP | 59229498 | 12/1984 |
| JP | 2001-244299 | 10/2002 |
| WO | WO-95/16006 | 6/1995 |
| WO | WO 96/30488 | 10/1996 |
| WO | WO-98/31768 | 7/1998 |
| WO | WO 2007/024556 | 3/2007 |

OTHER PUBLICATIONS

Response filed by Applicant to the Office Action dated May 13, 2011 issued in related Australian Patent Application No. 2006283664.

Office Action dated Nov. 21, 2008 issued in related European Patent Application No. 06801505.6.

Response filed by Applicant to the Office Action dated Nov. 21, 2008 issued in related European Patent Application No. 06801505.6.

Office Action dated Apr. 1, 2011 issued in related European Patent Application No. 06801505.6.

Response filed by Applicant to the Office Action dated Apr. 1, 2011 issued in related European Patent Application No. 06801505.6.

Summons to Oral Proceedings dated Dec. 19, 2011 issued in related European Patent Application No. 06801505.6.

Office Action dated Dec. 9, 2011 issued in related Canadian Patent Application No. 2,618,915.

Response filed by Applicant to the Office Action dated Dec. 9, 2011 issued in related Canadian Patent Application No. 2,618,915.

Office Action dated Apr. 23, 2012 issued in related Canadian Patent Application No. 2,618,915.

Response filed by Applicant to the Office Action dated Apr. 23, 2012 issued in related Canadian Patent Application No. 2,618,915.

Office Action dated Nov. 1, 2007 issued in related U.S. Appl. No. 11/504,014.

Response filed by Applicant to the Office Action dated Nov. 1, 2007 issued in related U.S. Appl. No. 11/504,014.

Office Action dated Jun. 12, 2008 issued in related U.S. Appl. No. 11/504,014.

Response filed by Applicant to the Office Action dated Jun. 12, 2008 issued in related U.S. Appl. No. 11/504,014.

Office Action dated Dec. 9, 2008 issued in related U.S. Appl. No. 11/504,014.

Response filed by Applicant to the Office Action dated Dec. 9, 2008 issued in related U.S. Appl. No. 11/504,014.

Office Action dated Apr. 13, 2009 issued in related U.S. Appl. No. 11/504,014.

Response filed by Applicant to the Office Action dated Apr. 13, 2009 issued in related U.S. Appl. No. 11/504,014.

Office Action dated Nov. 2, 2009 issued in related U.S. Appl. No. 11/504,014.

Response filed by Applicant to the Office Action dated Nov. 2, 2009 issued in related U.S. Appl. No. 11/504,014.

Office Action dated May 12, 2010 issued in related U.S. Appl. No. 11/504,014.

Response filed by Applicant to the Office Action dated May 12, 2010 issued in related U.S. Appl. No. 11/504,014.

Office Action dated Jul. 8, 2011 issued in related U.S. Appl. No. 11/504,014.

Response filed by Applicant to the Office Action dated Jul. 8, 2011 issued in related U.S. Appl. No. 11/504,014.

Office Action dated Dec. 9, 2011 issued in parent U.S. Appl. No. 12/336,582.

Response filed by Applicant to the Office Action dated Dec. 9, 2011 issued in parent U.S. Appl. No. 12/336,582.

International Search Report dated Jun. 19, 2007 issued in related International Patent Application No. PCT/US2006/031786.

* cited by examiner

METHODS AND COMPOSITONS FOR ACID TREATMENT OF A METAL SURFACE

CROSS-REFERENCE TO RELATED APPLICATIONS

This application is a continuation of U.S. patent application Ser. No. 12/336,582, filed Dec. 17, 2008, now U.S. Pat. No. 8,252,195, which is a divisional of U.S. patent application Ser. No. 11/504,014, filed Aug. 15, 2006, which claims the benefit of the priority of U.S. Provisional Patent Application No. 60/709,452, filed Aug. 19, 2005, now expired. All of these priority applications are incorporated herein by reference in their entirety.

BACKGROUND OF THE INVENTION

Articles made of aluminum or aluminum alloy, are customarily manufactured by a metal-forming operation called drawing and ironing. In the course of this and similar metal-forming operations a lubricant oil is applied to the surface of the metal being deformed, and some abraded aluminum particles and other contaminates (usually referred to as "smut") adhere to the metal surface, especially to the inner walls of such beverage containers. The surfaces are protected by subsequent chemical-conversion coating and/or paint coating techniques. Therefore, the above-mentioned lubricant oil or smut must be removed, by cleaning, from the metal surfaces before the chemical-conversion coating.

This surface cleaning is normally applied by means of an acidic cleaning agent, which appropriately etches the metal surfaces. The currently used acidic cleaning agents used for smut-removal have generally been ones containing chromic acid or hydrofluoric acid. Especially, the cleaning agent containing the hydrofluoric acid is superior in enabling the low-temperature acidic cleaning (e.g., up to 50° C.).

U.S. Pat. Nos. 4,728,456 and 4,851,148 disclose a cleaning agent including an acidic cleaning agent of pH 2 or below prepared from sulfuric acid and nitric acid containing little or no fluoric ions with the addition of ferric ions serving an accelerator instead of fluoride ions, and a method for controlling the oxidation-reduction potential of the cleaning bath to control the ferric ion concentration in the bath, respectively.

PCT published application WO 93/01332-A1 discloses an acidic cleaning solution containing sulfuric acid and/or nitric acid and ferric ions serving as an accelerator for etching instead of fluoride ions, and further containing oxidized ion of diphenylamine having color-change potential (that is, at a transition of a certain potential, color becomes transparent) in the vicinity of standard oxidation-reduction potential (+0.77+/−0.09 V) where ferric ions ($Fe^{3+}$) are changed into ferrous ions ($Fe^{2+}$), oxidized ions of diphenylbenzidine and oxidized ions of sulfonic diphenylamine, and the cleaning process for controlling the ferric ion concentration by controlling the color-change point.

U.S. Pat. No. 3,607,484 discloses is a corrosion liquid consisting of sulfuric acid aqueous solution with the addition of metals (ions of Cu, Fe, Ni, Co, Sn, Zn, etc.) having a smaller ionization tendency than aluminum and 7 g ion/L of at least one selected from halogen ions ($F^-$, $Br^-$, $I^-$) besides $Cl^-$, $PO_4^{3-}$, pyrophosphoric ion, pentaphosphoric ion and so on.

Japanese Patent Publication No. 47-39823 discloses a corrosion liquid containing 0.1 to 7.0 g ion/L of at least one of $Cl^-$, $F^-$, $Br^-$, $I^-$, phosphoric ion, pyrophosphoric ion, pentaphosphoric ion and so on.

Generally, the etching reaction of aluminum within the acidic cleaning solution includes an anode reaction in which aluminum is changed into aluminum ions ($Al^{3+}$) and a cathode reaction in which $H^+$ in the cleaning solution is reduced into ½ $H_2$. Thus, the addition of ferric ions ($Fe^{3+}$) into the acidic cleaning solution simultaneously causes a cathode action for reducing $Fe^{3+}$ into $Fe^{2+}$ and the reduction of $H^+$, which accelerates the etching reaction of aluminum.

Further, the oxidizing agent is used to control the oxidation-reduction potential to control the ferric ion concentration within the bath, thereby suppressing the $Fe^{2+}$ concentration which increases accordingly as the etching reaction advances and oxidizing the $Fe^{2+}$ into $Fe^{3+}$.

It is however known that the oxidizing agent typically acts to oxidize and decompose the surfactant. Therefore, the addition of an oxidizing agent into an acidic cleaning aqueous solution containing a surfactant for improving the degreasing ability may cause accumulation of oxidized decomposed substance within the cleaning bath, which will lead to a reduction in the degreasing ability on the aluminum surfaces. On the contrary, the addition of excessive oxidizing agent in order to maintain the degreasing ability will increase the operating cost.

In PCT published application WO 91/19830-A1 there is proposed an "acidic liquid composition and process for cleaning aluminum" containing a mineral acid selected from the group of phosphoric acid, sulfuric acid, and nitric acid, multiply charged metallic ions, surfactant, and oxidizing agent for oxidizing the multiply charged metallic ions which were reduced during the cleaning operation, with the addition of 0.05 to 5 g/l of a $C_2$ to $C_{10}$ glycol for suppressing the decomposing reaction of surfactant due to the oxidizing agent.

In the case of using the acidic cleaning agent disclosed in U.S. Pat. Nos. 4,728,456 and 4,851,148, however, the treatment must be made at a higher temperature (70° C. to 80° C.) than the temperature (up to 50° C.) of acidic cleaning by means of acidic cleaning agent containing fluoric ions in order to obtain the same effect as the acidic cleaning by the acidic cleaning agent containing fluoride ions, which will be economically disadvantageous. Since a multiplicity of $Fe^{3+}$ ions are contained, a precipitation derived from ferric ions is produced, and in particular, iron hydroxide which is in the form of a precipitate may adhere to the heater section. Also, in the case of WO 93/01332-A1, it is necessary to perform acidic cleaning at high temperature, which will be economically disadvantageous.

The corrosion liquid disclosed in U.S. Pat. No. 3,607,484 and Japanese Patent Publication No. 47-39823 mainly aims to etch the aluminum alloy by electrodeposition in order to form a photoengraving. In the case of coexisting with the copper ion, as disclosed by U.S. Pat. No. 3,607,484, the oxidation-reduction potential is over 1.08 V in the etching treatment. Therefore, the use of Br ions as halogen ions besides Cl would lead to the reaction 2 $Br^- \rightarrow Br_2 + 2$ e, which leads to the production of harmful bromine gas. Thus, exclusive treatment facility must be provided, which will be economically disadvantageous. In addition, these corrosion liquids contain 56 g/l or more of bromide ions for its object in the examples, which is different in the object of etching from the present invention.

In the acidic cleaning aqueous solution disclosed in WO 91/19830-A1, the content of a $C_2$ to $C_{10}$ glycol for the suppression of decomposition reaction of surfactant by the oxidizing agent is 0.05 to 5 g/l (namely, 50 to 5000 ppm) within the acidic cleaning aqueous solution, and hence the glycol compounds do not solely have the etching accelerating effect.

Reversely, a large volume of addition will increase the effective ingredients, which will increase the load of liquid waste treatment.

The present invention was conceived in view of the above conventional problems, of which an object is to provide an acidic cleaning solution for aluminum and aluminum alloy and its cleaning process.

SUMMARY OF THE INVENTION

The invention relates to compositions and methods that are useful in etching a metal surface. In particular, the invention relates to novel acid compositions and methods of using such compositions in etching an aluminum surface prior to anodizing to dissolve impurities, imperfections, scale, and oxide. The composition is effective in maintaining its etching capacity and in removing smut produced by the etching of an aluminum surface as well as in general cleaning.

Alkaline etch is the most popular and common etch process prior to sulfuric acid anodizing. The present invention encompasses novel methods of etching a metal, preferably aluminum, to dissolve impurities, imperfections, scale and oxide from the metal surface, preferably an aluminum surface. The method also provides a technique to remove or minimize extrusion lines to produce a uniform texture and better appearance for the finished product.

It has now been discovered that an aluminum alloy may be etched in an acid solution at a temperature from about 70° F. to about 200° F., preferably from about 70° F. to about 150° F. The etch composition of the present invention encompasses an aqueous, acidic solution comprising at least one organic acid, at least one acid salt, at least one surfactant, at least one grain refiner, and at least one fluoride salt or a combination thereof. The etch composition can optionally further comprise at least one mineral acid. The methods of the invention provide compositions with a uniform texture.

In one embodiment the invention encompasses a composition for etching a metal, preferably aluminum or aluminum alloy, comprising an aqueous acidic solution comprising one or more one or more organic acids, fluoride ion compounds, such as for example a fluoride salt one or more grain refiners, and one or more surfactants. Optionally the composition comprises one or more mineral acids.

In another embodiment the invention encompasses a composition for etching a metal, preferably aluminum or aluminum alloy, comprising ammonium bifluoride, hydrofluoric acid, glycolic acid, and a surfactant.

In yet another embodiment the invention encompasses a method of treating the surface of a metal, preferably aluminum or aluminum alloy, which comprises treating the metal (preferably the aluminum or aluminum allow) with a composition comprising an aqueous acidic solution comprising one or more one or more organic acids, fluoride ion compounds, such as for example a fluoride salt one or more grain refiners, and one or more surfactants. The method further encompasses optionally treating with one or more mineral acids.

DETAILED DESCRIPTION OF THE INVENTION

Definitions

As used herein and unless otherwise indicated, the term "alkyl" or "alkyl group" means a saturated, monovalent, unbranched (i.e., linear) or branched hydrocarbon chain. An "alkyl group" further means a monovalent group selected from $(C_1\text{-}C_8)$alkyl, $(C_2\text{-}C_8)$alkenyl, and $(C_2\text{-}C_8)$alkynyl, optionally substituted with one or two suitable substituents. Preferably, the hydrocarbon chain of a hydrocarbon group is from 1 to 6 carbon atoms in length, referred to herein as "$(C_1\text{-}C_6)$hydrocarbon." Examples of alkyl groups or hydrocarbon groups include, but are not limited to, $(C_1\text{-}C_6)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, and hexyl, and longer alkyl groups, such as heptyl, and octyl. An alkyl group can be unsubstituted or substituted with one or two suitable substituents.

As used herein and unless otherwise indicated, the term "aryl" refers to a monovalent aromatic hydrocarbon group derived by the removal of one hydrogen atom from a single carbon atom of a parent aromatic ring system (e.g., removal of a H atom from benzene). Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. Preferably, an aryl group comprises from 6 to 24 carbon atoms.

As used herein and unless otherwise indicated, the term "etching" or "etch" will be understood by persons of ordinary skill in the art to include, but not be limited to cleaning of an aluminum or aluminum alloy surface; dissolving impurities, imperfections, scale or oxide from an aluminum or aluminum alloy surface.

As used herein and unless otherwise indicated, the term "fluoride salt(s)" and "fluoride ion compounds" are used interchangeably and will be understood by persons of ordinary skill in the art to include, but not be limited to, fluoride salts and bifluoride salts including metal salts, ammonium salts and quaternary ammonium salts. Illustrative examples of the fluoride metal salts include those which have high solubility, such as potassium fluorides, sodium fluoride, potassium hydrogen fluoride, sodium hydrogen fluoride and the like. Examples of the ammonium salts encompassed by the invention include, but are not limited to, ammonium fluoride and ammonium hydrogen fluoride (ammonium hydrogen fluoride). Examples of the quaternary ammonium salts encompassed by the invention include, but are not limited to, tetramethyl-ammonium fluoride, methylamine hydrofluoride, 2-hydroxyethyltrimethyl-ammonium fluoride, tetramethylammonium hydrogen fluoride.

As used herein and unless otherwise indicated, the term "grain refiner" refers to any material that is added to a metal or alloy because of its high melting temperature that enhances the physical properties of the metal or alloy. Illustrative examples of grain refiners include, but are not limited to, sodium, potassium, or ammonium salts. Particular examples of grain refiners include, but are not limited to sodium phosphate, ammonium phosphate, or diammonium phosphate or mixtures thereof.

As used herein and unless otherwise indicated, the term "organic acid" includes, but is not limited to, acetic acid, propionic acid, butyric acid, isobutyric, valeric acid, caproic acid, caprylic acid, monochloroacetic acid, dichloroacetic acid, trichloroacetic acid, monofluoroacetic acid, difluoroacetic acid, trifluoroacetic acid, α-chlorobutyric acid, β-chlorobutyric acid, γ-chlorobutyric acid, lactic acid, glycolic acid, pyruvic acid, glyoxalic acid, acrylic acid and like monocarboxylic acids, methanesulfonic acid, toluenesulfonic acid and like sulfonic acids, oxalic acid, succinic acid, adipic acid, tartaric acid, citric acid and like polycarboxylic acids.

Compositions

In one embodiment the invention encompasses novel aqueous acidic compositions for treating the surface of a metal. In an illustrative embodiment, the compositions are useful for treating a surface prior to anodizing the surface. In another embodiment, the compositions are useful for etching a surface to dissolve impurities, imperfections, scale and/or oxide from the metal surface. In a preferred embodiment, the metal surface is an aluminum or aluminum alloy surface. The compositions are also useful for removing or minimizing extrusion line to produce a uniform texture and better appearance for the finished surface.

In another embodiment, the compositions of the invention comprise one or more fluoride ion compounds, one or more organic acids, and one or more surfactants or combinations thereof. The composition optionally comprises one or more grain refiners and/or one or more mineral acids.

Another embodiment of the invention encompasses an aqueous, acidic solution comprising one or more grain refiners, one or more fluoride ion compounds, such as for example a fluoride salt, one or more grain refiners, and one or more surfactants. The composition optionally comprises one or more organic acids and/or one or more mineral acids.

In another embodiment, the compositions of the invention have a pH from about 2.0 to about 5.0, preferably from about 3.0 to about 4.0. In an illustrative embodiment, the compositions overcome limitations of alkaline etch solutions.

In another illustrative embodiment, the organic acid of the invention includes, but is not limited to, oxalic acid or glycolic acid or mixtures thereof. Preferably, the organic acid is present in an amount from about 1 to about 30 grams per liter, more preferably from about 2.5 to about 25 grams per liter, and even more preferably from about 5 to about 20 grams per liter.

In another illustrative embodiment, the surfactant of the invention includes, but is not limited to, nonionic surfactant, an amphoteric surfactant, or a synergistic surfactant. Preferably, the surfactant comprises salts of alkyl aryl sulfonates, alkyl sulfonates, alkyl ether sulfates, alkyl sulfates, alkyl taurates, alkyl sulfosuccinates, hydrocarbon derivatives, abietic acid derivatives, ethoxylated primary alcohols, and modified polyethoxylated alcohols, individually or in combinations of two or more. Preferably, the surfactant is present in an amount from about 1 to about 3 grams per liter.

In another illustrative embodiment, the fluoride ion compound of the invention includes, but is not limited to, hydrofluoric acid, hydrofluorosilic acid, or fluoroboric acid or mixtures thereof. In another preferred embodiment, the fluoride ion compound is a fluoride salt. Preferred fluoride salts include, but are not limited to, sodium fluoride, potassium fluoride, ammonium bifluoride or mixtures thereof. Preferably, the fluoride ion compound is present in an amount from about 5 to about 225 grams per liter, preferably from about 10 to about 200 grams per liter, more preferably from about 20 to about 80 grams per liter, and even more preferably from about 60 to about 70 grams per liter.

In another illustrative embodiment, the grain refiner of the invention includes, but is not limited to, sodium phosphate, ammonium phosphate, or diammonium phosphate or a mixture thereof. In an illustrative embodiment, the composition comprises a single grain refiner. In another illustrative embodiment, the composition comprises combinations of two or more grain refiners. In an illustrative embodiment, the grain refiner is present in an amount of from about 1 to about 50 grams per liter, preferably from about 5 to about 30 grams per liter, and more preferably from about 10 to about 20 grams per liter.

In another illustrative embodiment, the mineral acid of the invention is hydrofluoric acid, nitric acid, sulfuric acid, or phosphoric acid or mixtures thereof Preferably, the mineral acid is present in an amount from about 20 to about 100 grams per liter, more preferably from about 30 to about 90 grams per liter and even more preferably from about 40 to about 80 grams per liter.

In a particular embodiment, the invention encompasses a composition for etching aluminum or aluminum alloy, comprising ammonium bifluoride, hydrofluoric acid, glycolic acid, and surfactant.

Methods

Another embodiment of the invention encompasses a method of treating the surface of a metal, preferably aluminum or aluminum allow, which comprises treating the metal (preferably aluminum or aluminum allow) with a composition comprising a one or more fluoride ion compounds, one or more mineral acids, one or more organic acids and one or more surfactants.

In an illustrative embodiment, the treatment is done at a solution temperature of about 60° F. to about 200° F., preferably at a solution temperature of about 70° F. to about 150° F., and more preferably at a solution temperature of about 100° F. to about 120° F. Preferably, the treatment is done from about 0.5 to about 15 minutes, preferably from about 1 to about 10 minutes, and more preferably from about 3 to about 5 minutes.

In one embodiment the invention encompasses a novel method for treating the surface of a metal comprising contacting the surface of the metal with an aqueous acidic composition. In an illustrative embodiment, the methods are useful for treating a surface prior to anodizing the surface. In another embodiment, the methods are useful for etching a surface to dissolve impurities, imperfections, scale and/or oxide from the metal surface. In a preferred embodiment, the metal surface is an aluminum or aluminum alloy surface. The methods are also useful for removing or minimizing extrusion line to produce a uniform texture and better appearance for the finished surface.

In another embodiment, the methods of the invention comprise contacting a metal surface, preferably aluminum or aluminum alloy, with one or more fluoride ion compounds, one or more organic acids, and one or more surfactants or combinations thereof. The methods optionally comprise contacting the metal surface with one or more grain refiners and/or one or more mineral acids.

Another embodiment of the invention encompasses a method for treating a metal surface, preferably aluminum or aluminum alloy comprising contacting the metal surface with one or more grain refiners, one or more fluoride ion compounds, such as for example a fluoride salt, one or more grain refiners, and one or more surfactants. The method optionally comprises treating a metal surface with one or more organic acids and/or one or more mineral acids.

In another embodiment, the methods of the invention encompass contacting a metal surface with a composition of the invention having a pH from about 2.0 to about 5.0, preferably from about 3.0 to about 4.0. In an illustrative embodiment, the methods overcome limitations of alkaline etch solutions.

In another illustrative embodiment, the organic acid encompassed by the method for treating a metal surface, preferably aluminum or aluminum alloy, include, but are not limited to, oxalic acid or glycolic acid or mixtures thereof. Preferably, the organic acid is present in an amount from about 1 to about 30 grams per liter, more preferably from about 2.5 to about 25 grams per liter, and even more preferably from about 5 to about 20 grams per liter.

In another illustrative embodiment, the surfactants encompassed by the method for treating a metal surface, preferably aluminum or aluminum alloy, include, but are not limited to, a nonionic surfactant, an amphoteric surfactant, or a synergistic surfactant. Preferably, the surfactant comprises salts of alkyl aryl sulfonates, alkyl sulfonates, alkyl ether sulfates, alkyl sulfates, alkyl taurates, alkyl sulfosuccinates, hydrocarbon derivatives, abietic acid derivatives, ethoxylated primary alcohols, and modified polyethoxylated alcohols, individually or in combinations of two or more. Preferably, the surfactant is present in an amount from about 1 to about 3 grams per liter.

In another illustrative embodiment, the fluoride ions encompassed by the method for treating a metal surface, preferably aluminum or aluminum alloy, include, but are not limited to, hydrofluoric acid, hydrofluorosilic acid, or fluoroboric acid or mixtures thereof In another preferred embodiment, the fluoride ion compound is a fluoride salt. Preferred fluoride salts include, but are not limited to, sodium fluoride, potassium fluoride, ammonium bifluoride or mixtures thereof. Preferably, the fluoride ion compound is present in an amount from about 5 to about 225 grams per liter, preferably from about 10 to about 200 grams per liter, more preferably from about 20 to about 80 grams per liter, and even more preferably from about 60 to about 70 grams per liter.

In another illustrative embodiment, the grain refiners encompassed by the method for treating a metal surface, preferably aluminum or aluminum alloy, include, but are not limited to, sodium phosphate, ammonium phosphate, or diammonium phosphate or a mixture thereof. In an illustrative embodiment, the method comprises a single grain refiner. In another illustrative embodiment, the method comprises combinations of two or more grain refiners. In an illustrative embodiment, the grain refiner is present in an amount of from about 1 to about 50 grams per liter, preferably from about 5 to about 30 grams per liter, and more preferably from about 10 to about 20 grams per liter.

In another illustrative embodiment, the mineral acid encompassed by the method for treating a metal surface, preferably aluminum or aluminum alloy, include, but are not limited to, hydrofluoric acid, nitric acid, sulfuric acid, or phosphoric acid or mixtures thereof. Preferably, the mineral acid is present in an amount from about 20 to about 100 grams per liter, more preferably from about 30 to about 90 grams per liter and even more preferably from about 40 to about 80 grams per liter.

In a particular embodiment, the invention encompasses a method for etching aluminum or aluminum alloy, comprising contacting the aluminum or aluminum alloy with ammonium bifluoride, hydrofluoric acid, glycolic acid, and surfactant.

An illustrative acidic liquid aluminum etching agent with a robust, durable cleaning activity can be obtained by preparing the acidic liquid aluminum cleaner as follows:

A mineral acid is exemplified by sulfuric acid, nitric acid, phosphoric acid, and the like, and at least one selection therefrom should be added. The preferable concentrations are as follows: about 80 g/L for phosphoric acid, about 80 g/L for sulfuric acid, and about 80 g/L for nitric acid. The mineral acid may take the form of a single acid or may comprise a combination of two or more acids, which is freely selected within a range, which does not adversely affect the surface cleaning performance. Such mixed acids are exemplified by tricomponent mixed acids of 3 to 10 g/L phosphoric acid, 5 to 15 g/L sulfuric acid, and 0.5 to 2 g/L nitric acid, and by bicomponent mixed acids of 10 to 20 g/L sulfuric acid and 0.5 to 2 g/L nitric acid.

Through the use of these mineral acids, the pH preferably does not exceed 2.0 and more preferably is 0.6 to 2. Preferably, no particular restriction is placed on the lower pH limit.

The surfactant component preferably is a hydrocarbon derivative, abietic acid derivatives, ethoxylated primary alcohols, and modified polyethoxylated alcohols, and these may be used singly or in combinations of two or more. The preferable concentration is 0.1 to 10 g/L and more preferably 0.5 to 3 g/L.

In addition, aluminum ions are eluted during cleaning with the acidic liquid cleaner according to the present invention, and this may reduce its cleaning efficiency. Accordingly, as a countermeasure in response to this, optionally a chelating agent, which sequesters the aluminum ions may also be present. Chelating agents useable for this purpose are exemplified by citric acid, oxalic acid, tartaric acid, gluconic acid, and the like.

The acidic liquid aluminum cleaner prepared according to the present invention is highly effective for the removal of smut and scale from aluminum and aluminum alloy as well as for the etching of same.

The practice of the invention may be further appreciated from the following working and comparison examples, which are meant to provide illustrative embodiments and are in no way intended to limit the scope of the invention.

EXAMPLES

Example 1

Aluminum test specimens of 6063-T5 aluminum alloy were cleaned in acid cleaner, rinse then etched in the following acid etch composition of Table 1:

TABLE 1

| | |
|---|---|
| Hydrofluoric Acid 49% | 7.5 g/L |
| Fluoroboric Acid 49% | 5.0 g/L |
| Ammonium Bifluoride | 60.0 g/L |
| Sodium Phosphate | 15.0 g/L |
| Surfactant | 1.0 g/L |

The Solution pH was adjusted to 3.4.

Test samples were etched in the above solution for 1.0, 3.0 and 5.0 minutes respectively. The etched samples were subjected to rinse, deox, rinse, dry off and weight loss taken before and after etch were performed on all test samples to determine the aluminum dissolution or removal rate. For comparison, a controlled aluminum specimen was acid cleaned, rinse then etched in aqueous alkaline etch bath for 5.0 and 10.0 minutes respectively at a temperature of 145°-150° F.

The etch bath contained 90.0 g/L sodium hydroxide, 100.00 g/L dissolved aluminum and 2.0% volume of Houghton no-dump/long life etchant additives. As with the acid etched samples, all alkaline etched samples were subjected to rinse, deox, rinse, dry off and weight loss taken before and after etch.

All acid and alkaline etched samples were anodized as noted in Table 2:

TABLE 2

| | | |
|---|---|---|
| 1. | Rinse | Room Temperature |
| 2. | Deox | Houghto Deox ™ A-1745 at 7.0% volume for 1.0 min. |
| 3. | Rinse | Room Temperature |
| 4. | Anodizing Sulfuric Acid | 180 g/L |
| | Aluminum | 10 g/L |
| | Current Density | 18 amps per sq. ft. |
| | Bath Temperature | 72° F. |
| | Anodizing Time | 30 min. |
| | Coating Thickness | 0.7 mil |
| 5. | Rinse | Room Temperature |
| 6. | Houghto Safe ® A-620 Seal (Houghton Mid-Temp. Seal) 3% volume at 180° F. for 10.0 min. | |
| 7. | Rinse | |
| 8. | Dry off | |

Results from illustrative embodiments of the invention compared to a base alkaline etch are described in Table 3.

Aluminum removal is measured in grams per square foot of aluminum removal (i.e., g/ft$^2$). All anodized samples were carefully evaluated for the quality of the etch by visual examinations and by the gloss reading using reflectometer at 60° angle.

TABLE 3

| Etch Bath | Temp. (° F.) | Al Removed (g/ft$^2$) | Time (min.) | Gloss |
|---|---|---|---|---|
| Acid | 115 | 0.70 | 1.0 | 6.2 |
| Acid | 115 | 1.17 | 3.0 | 5.9 |
| Acid | 115 | 1.42 | 5.0 | 4.9 |
| Alkaline | 145 | 5.4 | 5.0 | 18.1 |
| Alkaline | 145 | 10.5 | 10.0 | 9.4 |

Example 2

Aluminum test specimens of 6063-T$_5$ aluminum alloy were etched in the following acid bath (Table 4).

TABLE 4

| | |
|---|---|
| Hydrofluoric acid 49% | 10.0 g/L |
| Ammonium bifluoride | 80.0 g/L |
| Diammonium phosphate | 30.0 g/L |
| Surfactant | 200.0 ppm |
| pH | 3.4-3.6 |

Aluminum removal rate was performed as in Example (1). All samples were anodized the same as Example (1) and the finished samples were evaluated using same method as in Example (1). Results from Example 2 are described in Table 5.

TABLE 5

| Etch Bath | Temp. (° F.) | Al Removed (g/ft$^2$) | Time (min.) | Gloss |
|---|---|---|---|---|
| Acid | 110 | 0.85 | 2.0 | 6.0 |
| Acid | 110 | 1.51 | 6.0 | 4.8 |
| Acid | 110 | 1.53 | 10.0 | 4.2 |

Example 3

Aluminum test specimens of 6063-T$_5$ aluminum alloy that contained high zinc content at 0.1% in its alloy were etched separately in the following etch baths (Table 6).

TABLE 6

| Acid Etch Bath: | |
|---|---|
| Bath composition same as in example (2) | |
| Bath temperature | 110° F. |
| Etch time | 5.0 minutes |
| Alkaline Etch Bath: | |
| Sodium Hydroxide | 8.0 oz/gal |
| Aluminum | 100.0 g/L |
| Temperature | 145.0° F. |
| Etch Time | 10.0 minutes |

After etch all samples were subjected to rinse, deox, rinse, dry off and carefully evaluated.

Results:

Alkaline etched samples had very rough or galvanizing problem while acid etched parts had uniform matt finish.

Test Results:

1. The compositions and methods of the invention comprising the acid etch compositions produce excellent uniform matte finish.

2. The compositions and methods of the invention comprising the acid etch compositions are more effective than alkaline etch in hiding extrusion lines, scratches or defects than alkaline etch.

3. The compositions and methods of the invention comprising the acid etch compositions produce lower gloss reading than alkaline etch.

4. The compositions and methods of the invention comprising the acid etch compositions operates at lower bath temperature and unlike alkaline etch does not require cooling.

5. The compositions and methods of the invention comprising the acid etch compositions reduces etch time to 3.0-5.0 minutes compared to 9-15 minutes in case of alkaline etch 6. The compositions and methods of the invention comprising the acid etch compositions produce less aluminum removal 0.5-1.5 gr/ft$^2$ vs 9.0-13.0 gr/ft$^2$ in case of alkaline etch.

7. The compositions and methods of the invention comprising the acid etch compositions reduce waste. Due to the fact that 1.0 lb. of aluminum is removed in the etch process results in 20.0 lbs. of waste sludge, therefore acid etch presents significant waste sludge reduction.

8. The compositions and methods of the invention comprising the acid etch compositions parts are easy to rinse and require less rinse tanks than alkaline etch. This presents less water consumption.

9. The compositions and methods of the invention comprising the acid etch compositions are more effective in preventing pitting prior to anodizing.

10. The compositions and methods of the invention comprising the acid etch compositions are not sensitive to zinc content in the aluminum alloy as in the case of alkaline etch. High zinc content results in a rough finish or galvanizing defect.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method of etching aluminum, said method comprising contacting said aluminum with a composition consisting essentially of:

(a) about 20 to about 80 grams per liter of ammonium bifluoride;

(b) about 1 to about 50 grams per liter of diammonium phosphate; and (c) water.

2. The method according to claim 1, wherein said etching is performed at a composition temperature of 70° F. to 150° F.

3. The method according to claim 2, wherein said etching is performed at a temperature of about 100° F. to about 125° F.

4. The method according to claim 1, wherein said etching is performed in about 1 to about 3 minutes.

5. The method according to claim 1, wherein said etching is performed in about 0.5 to about 10 minutes.

6. The method according to claim 1, wherein said etching is performed at a pH of about 2 to about 5.

7. The method according to claim 1, further comprising rinsing the etched aluminum.

8. The method according to claim 1, wherein said aluminum is an aluminum alloy.

9. The method according to claim 1, wherein the etched aluminum is resistant to pitting.

10. The method according to claim 1, wherein the etch aluminum bath does not require cooling.

11. The method according to claim 1, wherein the etched aluminum has a uniform matte finish when analyzed using a reflectometer at a 60° angle.

12. The method according to claim 1, wherein extrusion lines on said etched aluminum are removed or minimized.

13. The method according to claim 1, which results in a significant reduction of waste products from the aluminum etching process.

14. The method according to claim 1, wherein said etching removes about 0.5 to about 1.5 gr/$ft^2$ of aluminum.

15. The method according to claim 1, which results in a reduction of water consumption in the aluminum etching process.

16. The method according to claim 1, consisting essentially of about 5 to about 30 grams per liter of diammonium phosphate.

17. The method according to claim 1, consisting of about 10 to about 20 grams per liter of diammonium phosphate.

18. The method according to claim 1, consisting of about 60 to 70 grams per liter of ammonium bifluoride.

19. A method of etching aluminum, said method comprising contacting said aluminum with a composition consisting of:

(a) about 20 to about 80 grams per liter of ammonium bifluoride;

(b) about 1 to about 50 grams per liter of diammonium phosphate; and (c) water.

* * * * *